United States Patent
Chou et al.

(10) Patent No.: US 9,671,774 B2
(45) Date of Patent: Jun. 6, 2017

(54) ULTRASONIC MICRON PRECISION MOLDING APPARATUS

(71) Applicant: Chen-Chia Chou, Taipei (TW)

(72) Inventors: Chen-Chia Chou, Taipei (TW); I-Wei Su, Taipei (TW); Hao-Yen Liao, Taipei (TW); Kuei-Chih Feng, Taipei (TW)

(73) Assignee: Chen-Chia Chou, Taipei (TW)

( * ) Notice: Subject to any disclaimer, the term of this patent is extended or adjusted under 35 U.S.C. 154(b) by 225 days.

(21) Appl. No.: 14/736,680

(22) Filed: Jun. 11, 2015

(65) Prior Publication Data

US 2016/0052066 A1   Feb. 25, 2016

(30) Foreign Application Priority Data

Aug. 21, 2014   (TW) .............................. 103128738 A

(51) Int. Cl.
| | |
|---|---|
| *G06F 19/00* | (2011.01) |
| *B06B 1/02* | (2006.01) |
| *B29C 65/00* | (2006.01) |
| *B29C 65/08* | (2006.01) |
| *B32B 37/00* | (2006.01) |
| *B23B 21/00* | (2006.01) |
| *G05B 19/18* | (2006.01) |
| *B23D 7/06* | (2006.01) |
| *B28D 5/04* | (2006.01) |
| *B23D 5/00* | (2006.01) |
| *B06B 3/00* | (2006.01) |

(52) U.S. Cl.
CPC .............. *G05B 19/182* (2013.01); *B06B 3/00* (2013.01); *B23D 5/00* (2013.01); *B23D 7/06* (2013.01); *B28D 5/047* (2013.01)

(58) Field of Classification Search
CPC ....................................................... B06B 3/00
See application file for complete search history.

(56) References Cited

U.S. PATENT DOCUMENTS

| | | | | |
|---|---|---|---|---|
| 4,864,904 | A  * | 9/1989 | Mishiro | ............... B23Q 15/013 82/137 |
| 5,202,066 | A  * | 4/1993 | Furusawa | ........... B29C 47/0071 264/328.1 |
| 2007/0244595 | A1* | 10/2007 | Statnikov | .................. B24B 1/04 700/160 |
| 2011/0042014 | A1* | 2/2011 | Vogler | ................. B23K 20/106 156/580.1 |

* cited by examiner

*Primary Examiner* — Mohammad Ali
*Assistant Examiner* — Md Azad
(74) *Attorney, Agent, or Firm* — Bacon & Thomas, PLLC

(57) ABSTRACT

An ultrasonic micron precision molding apparatus includes: an ultrasonic generating module, a tool and an amplitude transformer. The ultrasonic generating module provides ultrasonic frequency vibration. The tool is disposed below the ultrasonic generating module, and has a micron-level precision structure. The amplitude transformer is disposed between the ultrasonic generating module and the tool and has a first section and a second section, the first section is disposed at the junction of the amplitude transformer and the tool, and the distance between the second section and the tool is longer than the distance between the first section and the tool, wherein the width of the first section is greater than the width of the second section.

6 Claims, 9 Drawing Sheets

ULTRASONIC MICRON PRECISION MOLDING APPARATUS

BACKGROUND OF THE INVENTION (1) Field of the Invention

The invention relates to an ultrasonic molding apparatus, and especially relates to one that used in ultrasonic machining in micron precision.

(2) Description of the Prior Art

Currently, ultrasonic machining apparatus is mainly used in cutting and drilling brittle materials. Usually, the conventional ultrasonic machining apparatus comprises an ultrasonic generator, which originates in vibration frequency spectrum commonly about 15K Hertz of ultrasonic oscillation, connected with an amplitude transformer and a tool set so that the machining ability for cutting and drilling brittle workpieces of the tool set is enhanced by the resonated ultrasound vibration via the amplitude transformer.

However, in a common assembly, the conventional ultrasonic amplitude transformer is rigidly connected to the ultrasonic generator through a fixed fastening means so that the design flexibility of the amplitude transformer is limited. As shown in FIG. 1, a conventional composite converging ultrasonic amplitude transformer 20 is designed as combination of three portions of a cylindrical upper portion with input end 1, an inverted conical middle transitional portion and a cylindrical lower portion with an output end 2, wherein the round input end 1 is engaged with the ultrasonic generator 11 while the round output end 2 is engaged with the tool set 13. For fully taking advantage of augmenting the oscillation amplitude provided by an ultrasonic generator 11, the diameter of the round input end 1 is larger than that of the round output end 2 typically. Accordingly, the working area of the amplitude transformer 20, which indeed equals the diameter of the round output end 2, is unable to arbitrarily enlarge subject to the confinement of the diameter of the round input end 1. Thereby, some drawbacks are incurred by foregoing enlarging limitation of the working area of the amplitude transformer 20 as following.

1. With small working area of the amplitude transformer, the machining precision becomes uncontrollable, which does not meet the requirements of accurate precision and mass production in the industry.

2. With small working area of the amplitude transformer, the engaging stalk of the machining tool set is confined to small scale so that not only the design flexibility of the tool set is indirectly limited but also the tool set is susceptible to quickly wearing.

Having realized the pending and urgent drawbacks aforesaid, the applicant is inspired to figure out the present invention for providing a practical solution in promoting the processing precision of the ultrasonic machining field.

SUMMARY OF THE INVENTION

The object of the present invention is to provide an ultrasonic micron precision molding apparatus.

In order to achieve foregoing object, the present invention provides an ultrasonic micron precision molding apparatus, which comprises an ultrasonic generating module disposed at upper side, a tool of micron precision disposed at under side of the ultrasonic generating module, and an amplitude transformer sandwiched between the ultrasonic generating module and tool. Functionally, the ultrasonic generating module serves to originate ultrasonic frequency oscillation for launching the ultrasonic amplitude transformer to work as an ultrasonic intensifying resonator so that the tool acts as an ultrasonic machining head. The amplitude transformer has an enlarged engaging section with a first transverse cross-section firmly fixed on the tool, and the amplitude transformer has a second transverse cross-section parallel to the first transverse cross-section. The profile of the amplitude transformer in a three dimensional coordinate system is represented by three rectilinear axis lines named X axis, Y axis and Z axis vertical to each other, and the Z axis is vertical to the first and second transverse cross-sections. A distance from the second transverse cross-section to the tool is longer than a distance from the first transverse cross-section to the tool. An area of the first transverse cross-section is larger than an area of the second transverse cross-section.

After receiving the ultrasonic frequency oscillation from the ultrasonic generating module, the amplitude transformer has an X-axial deformation, a Y-axial deformation and a Z-axial deformation, wherein a numerical value of the X-axial deformation divided by the Z-axial deformation is larger than 0%, but less than 1%, and a numerical value of the Y-axial deformation divided by the Z-axial deformation is larger than 0%, but less than 1%.

In an embodiment of the present invention, the amplitude transformer has a third transverse cross-section parallel to the first and the second transverse cross-sections, and a distance from the third transverse cross-section to the tool is longer than the distance from the second transverse cross-section to the tool, and an area of the third transverse cross-section is larger than or equal to the area of the second transverse cross-section.

In an embodiment of the present invention, the amplitude transformer has a fourth transverse cross-section parallel to the first and the second transverse cross-sections, and a distance from the fourth transverse cross-section to the tool is longer than the distance from the second transverse cross-section to the tool, and an area of the fourth transverse cross-section is smaller than the area of the second transverse cross-section.

In an embodiment of the present invention, wherein the ultrasonic generating module comprises an ultrasound controller and a transducer with functions that the ultrasound controller serves to supply electric power together with vibration mode to the transducer while the transducer serves to originate and transfer ultrasonic frequency oscillation to the amplitude transformer.

In an embodiment of the present invention, an vibration amplitude of the ultrasonic frequency oscillation produced by the ultrasonic generating module is greater or equivalent to an vibration amplitude of the amplitude transformer.

In an embodiment of the present invention, wherein the material of the amplitude transformer is selected from a group consisting of stainless steel, die steel, tool steel, aluminum alloy, magnesium alloy and titanium alloy.

In an embodiment of the present invention, wherein a plurality of sampling points spread in the transverse cross-section of the amplitude transformer near the tool, which is called first section, are adopted to respectively simulate a "Z-axial deformation" for each sampling point for calculating a standard deviation for all these "Z-axial deformations" such that the value obtained by dividing the mean value of all these "Z-axial deformations" by the standard deviation is larger than 0%, but less than 1% normally.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
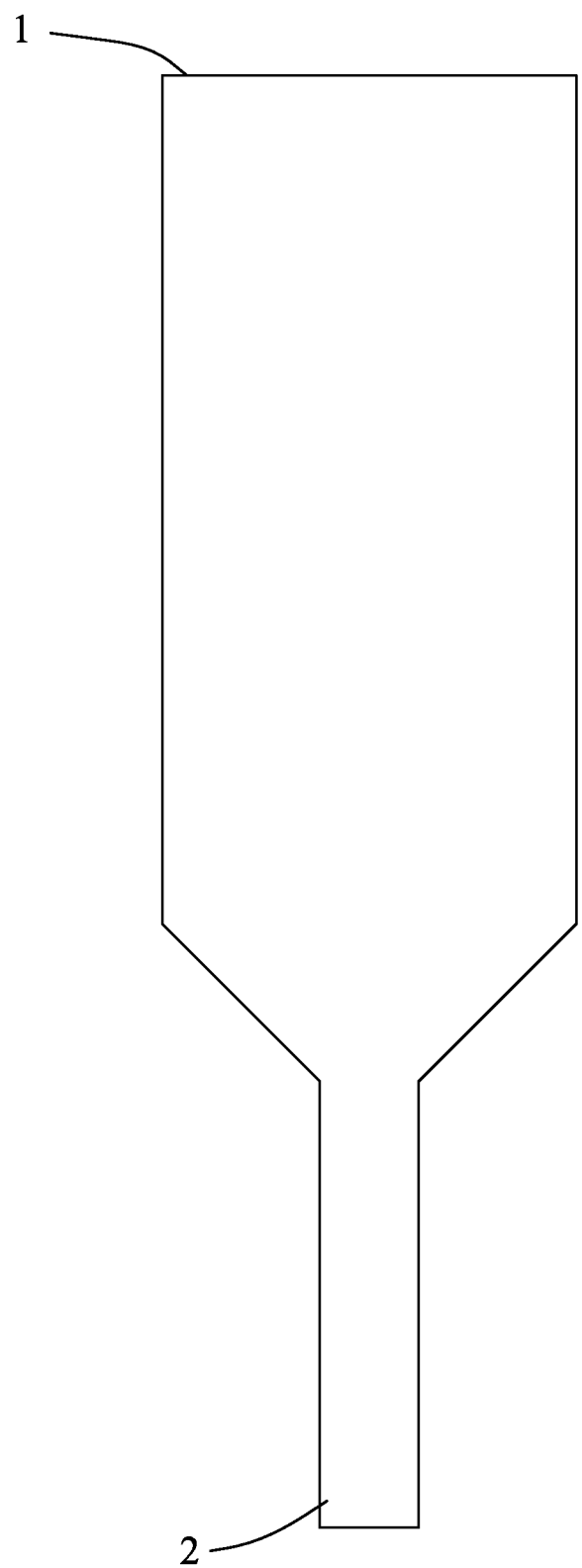
FIG. 1 is a planar profile showing the longitudinal cross-sections for a conventional amplitude transformer.
Figure 2:
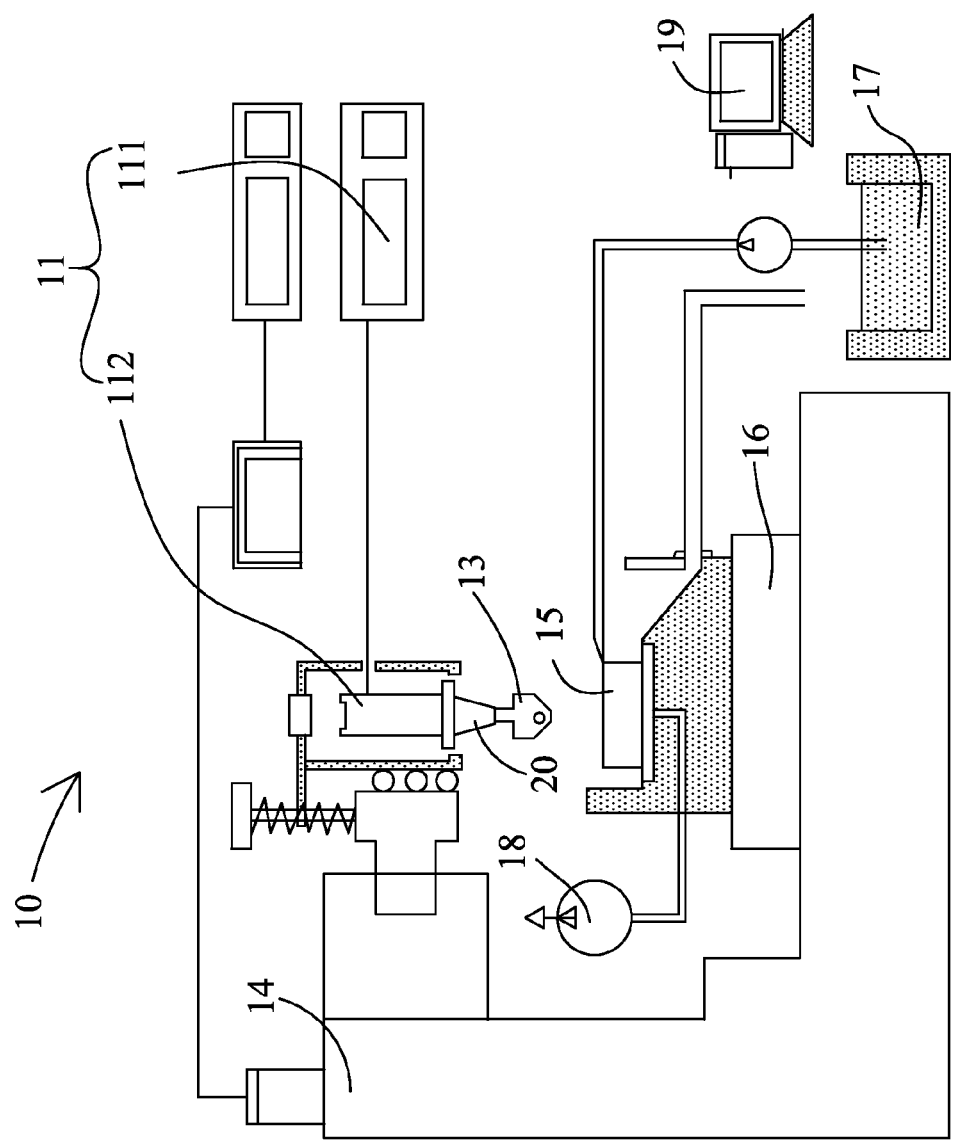
FIG. 2 is a diagram schematic view for an ultrasonic micron precision molding apparatus of the present invention.

As shown in FIG. 2, an ultrasonic machining apparatus 10 of the present invention is used for precision machining and molding for brittle materials such as glass, ceramic, sapphire, silicon wafer and so on, as well as for metal materials such as aluminum, iron, steel, stainless steel and so on. The ultrasonic machining apparatus 10 of the present invention comprises an ultrasonic generating module 11, a tool 13 of micron precision, an amplitude transformer 20, an adjustable precision mount 14, a precision processing platform 15 of X-Y plane, a precision displacement control system 16 of Z axis, a process cooling circulation system 17 and a precision positioning system 18. The ultrasonic generating module 11 includes an ultrasound controller 111 and a transducer 112. The amplitude transformer 20 is sandwiched between the ultrasonic generating module 11 and tool 13. The tool 13 of micron precision is disposed beneath the amplitude transformer 20. The ultrasound controller 111 is connected with the transducer 112 for serving to supply electric power together with vibration mode to the transducer 112. The transducer 112 is disposed on the adjustable precision mount 14 and fixed on the tool 13. Furthermore, the transducer 112 is rigidly connected to the ultrasonic amplitude transformer 20 for serving to originate ultrasonic frequency oscillation such that the amplitude transformer 20 is launched to function as an ultrasonic intensifying resonator. The adjustable precision mount 14 provides an securely assembling foundation for key parts aforesaid, which includes the transducer 112, the amplitude transformer 20 as well as the tool 13. The process cooling circulation system 17 and the precision positioning system 18 are functionally connected to the precision processing platform 15 while the precision processing platform 15 is stacked over the precision displacement control system 16 such that the precision processing platform 15 and precision displacement control system 16 are conjoined at the command of the precision positioning system 18.

During machining process mode, the workpiece is firstly fixed on the precision processing platform 15, the relative distance and position of the tool 13 to the workpiece is secondly preset by the precision positioning system 18, once the process cooling circulation system 17 has been properly functioned, the workpiece is thirdly driven by the precision displacement control system 16 approaching the tool 13 to a suitable position, the machining process of desire is fourthly started, and the workpiece is finally driven by the precision displacement control system 16 again to detach off from the tool 13 after the complete machining process is finished.

FIGS. 3A to 3E are different assembly variety for five typical is configurations of tool and amplitude transformer in a preferred exemplary embodiment of the present invention. For convenience of description each assembly configuration of the amplitude transformer 20 and the tool 13 shown in FIGS. 3A to 3E, certain expedient notations are adopted here. Regarding of the longitudinal cross-section of each assembly configuration, the assembly configuration shown in FIG. 3A can be occasionally named as "cylindrical assembly with lower recessed waist"; the assembly configuration shown in FIG. 3B can be occasionally named as "symmetric exponential assembly"; the assembly configuration shown in FIG. 3C can be occasionally named as "asymmetric exponential assembly"; the assembly configuration shown in FIG. 3D can be occasionally named as "barrel assembly"; and the assembly configuration shown in FIG. 3E can be occasionally named as "asymmetric composite stepped barbell assembly". With foregoing five different assembly configurations, each sectional size, area and shape of every transverse cross-section such as a first transverse cross-section 210, a second transverse cross-section 220, a third transverse cross-section 230, and a fourth transverse cross-section 240, which are taken against each sectional line A-B, C-D, E-F and G-H, is different from one to one so that they are not redundantly described respectively. For simplicity, the profile description of the amplitude transformer 20 is represented by the three dimensional Cartesian coordinate system with three rectilinear axis lines X, Y and Z (as shown in FIG. 4). The amplitude transformer 20 has an engaging section with the first transverse cross-section 210 firmly fixed on the tool 13. The second transverse cross-section 220 is parallel to the first transverse cross-section 210, and both transverse cross-sections 210, 220 are vertical the Z axis. A distance from the second transverse cross-section 220 to the tool 13 is longer than a distance from the first transverse cross-section 210 to the tool 13. An area of the first transverse cross-section 210 is larger than an area of the second transverse cross-section 220. Therefore, the innovative structure for each assembly configuration of the amplitude transformer 20 and the tool 13 of the present invention is contrived with enlarged engaging section for the amplitude transformer 20 and the tool 13, which is shown in each the transverse cross-section 210.

After the amplitude transformer 20 having been excited by ultrasonic frequency oscillation from the ultrasonic generating module 11, its performances essentially are affected by two key parameters of "distributions of the amplitude" and "distributions of the deformation" in respective axes, which are closely related to the assembly configuration of the amplitude transformer 20 and tool 13. Wherein, the ratio of "X-axial deformation" to "Z-axial deformation" notated by "X-axial deformation/Z-axial deformation" and also interpreted of "X-axial deformation divided by Z-axial deformation" is named as "deformation ratio of circumferential vibration in X-axis to axial vibration in Z-axis", whose numerical value is larger than 0%, but less than 1%, while the ratio of "Y-axial deformation" to "Z-axial deformation" notated by "Y-axial deformation/Z-axial deformation" and also interpreted of "Y-axial deformation divided by Z-axial deformation" is named as "deformation ratio of circumferential vibration in Y-axis to axial vibration in Z-axis", whose numerical value is also larger than 0%, but less than 1% normally since the shape for the first transverse cross-section 210 of the amplitude transformer 20 is symmetric. Accordingly, the "distributions of the amplitude" and "distributions of the deformation" in both X-axis and Y-axis are almost the same as each other. In addition, because the area of the first transverse cross-section 210 is larger than that of the second transverse cross-section 220, the vibration amplitude of the amplitude transformer 20 in first transverse cross-section 210 is less than or equal to that in second transverse cross-section 220 in Z axis.

Figure 3A:
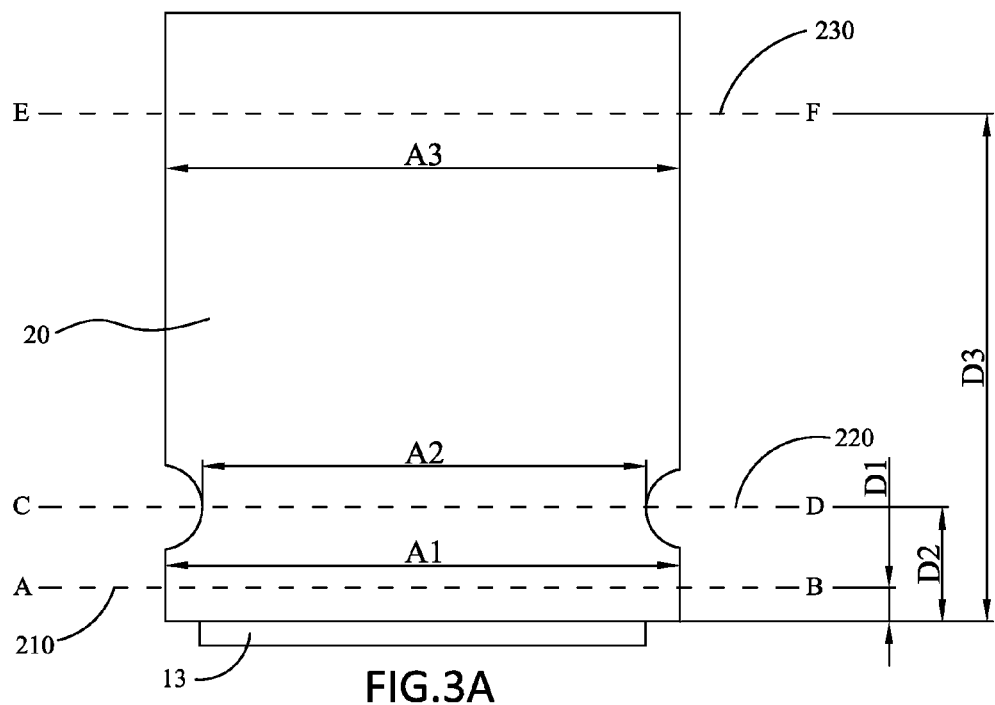
FIGS. 3A to 3E are different assembly variety for five typical configurations of tool and amplitude transformer in a preferred exemplary embodiment of the present invention.
Figure 3B:
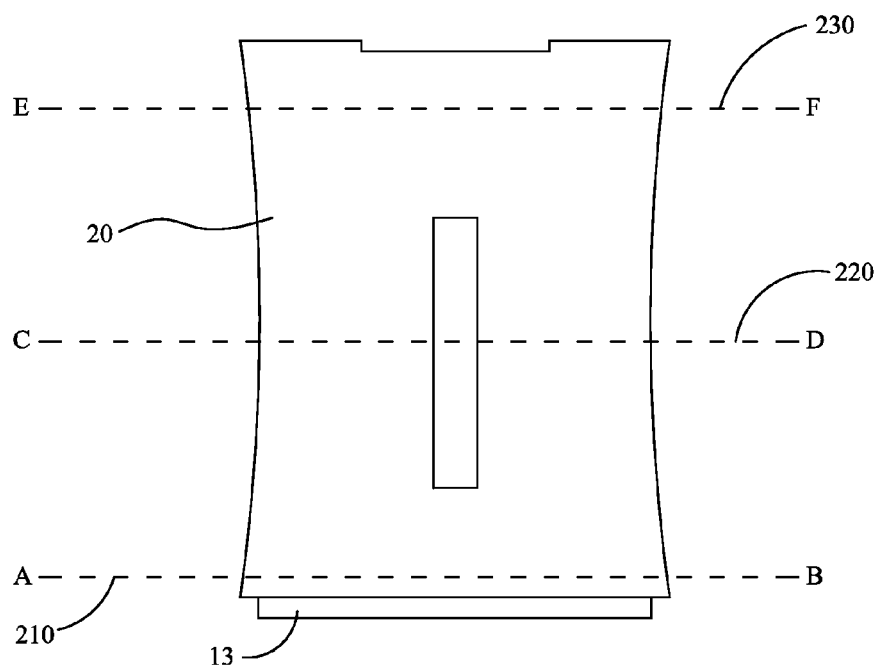
Figure 3C:
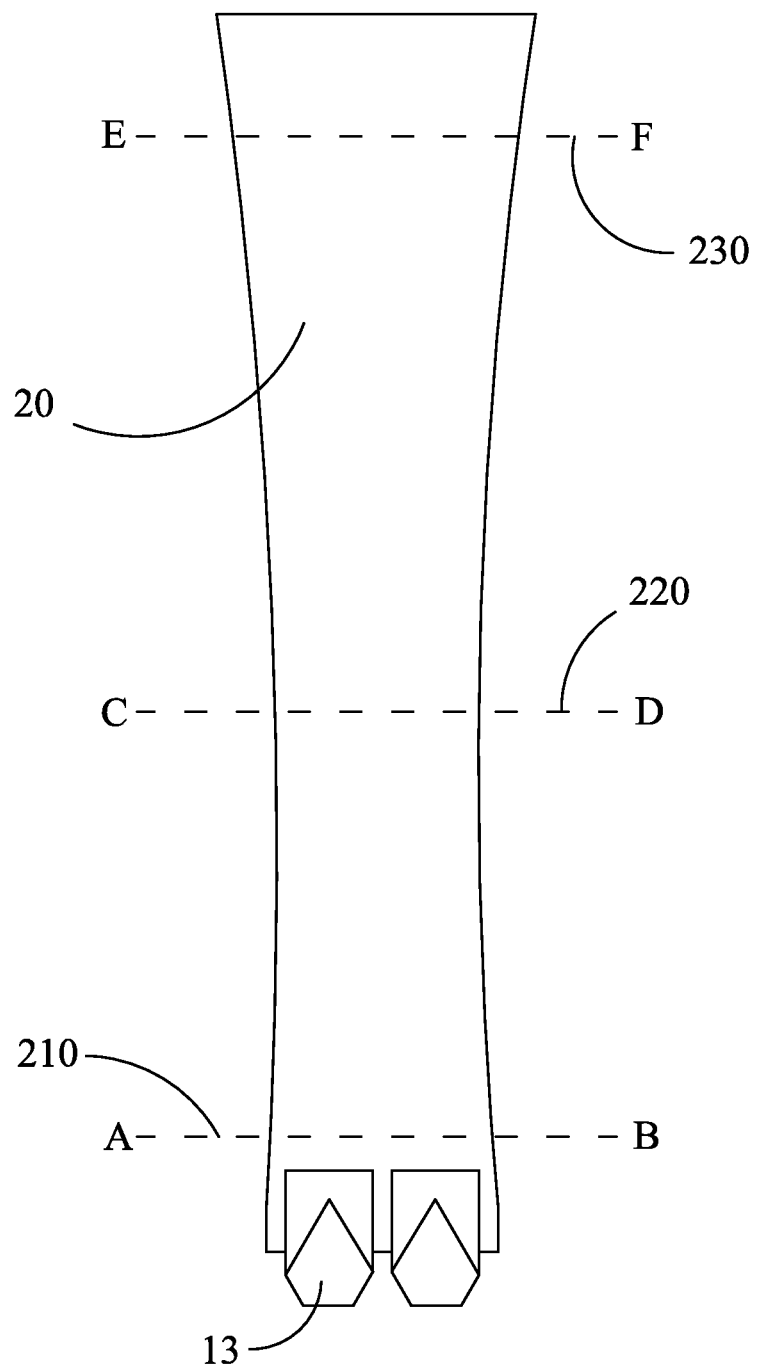
Figure 4:
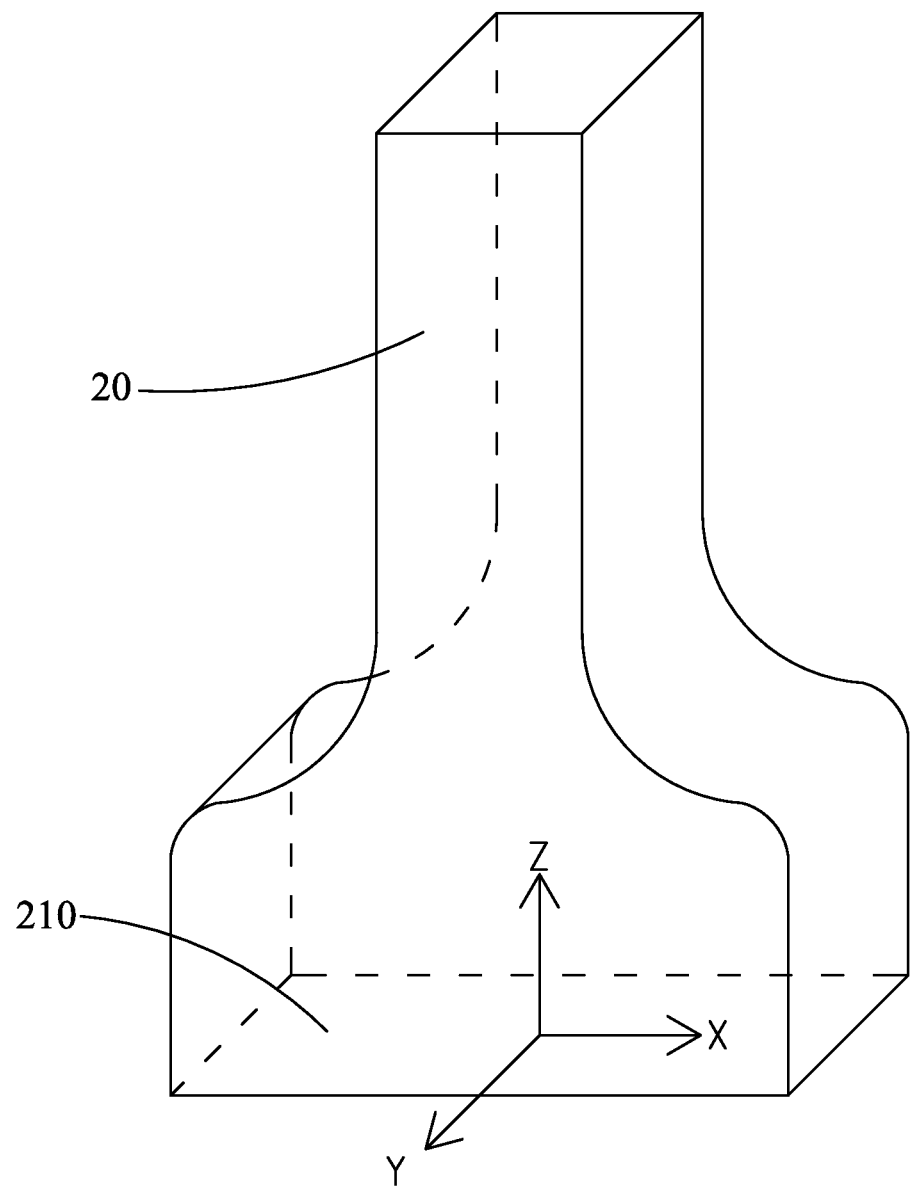
FIG. 4 is a perspective profile for an amplitude transformer in a preferred exemplary embodiment of the present invention.

As shown in FIG. 3A to 3C, the third transverse cross-section 230 parallel to the first and the second transverse cross-sections 210, 220, and a distance from the third transverse cross-section 230 to the tool 13 is longer than the distance from the second transverse cross-section 220 to the tool 13, and an area of the third transverse cross-section 230 is larger than or equal to the area of the second transverse cross-section 220.

Figure 3D:
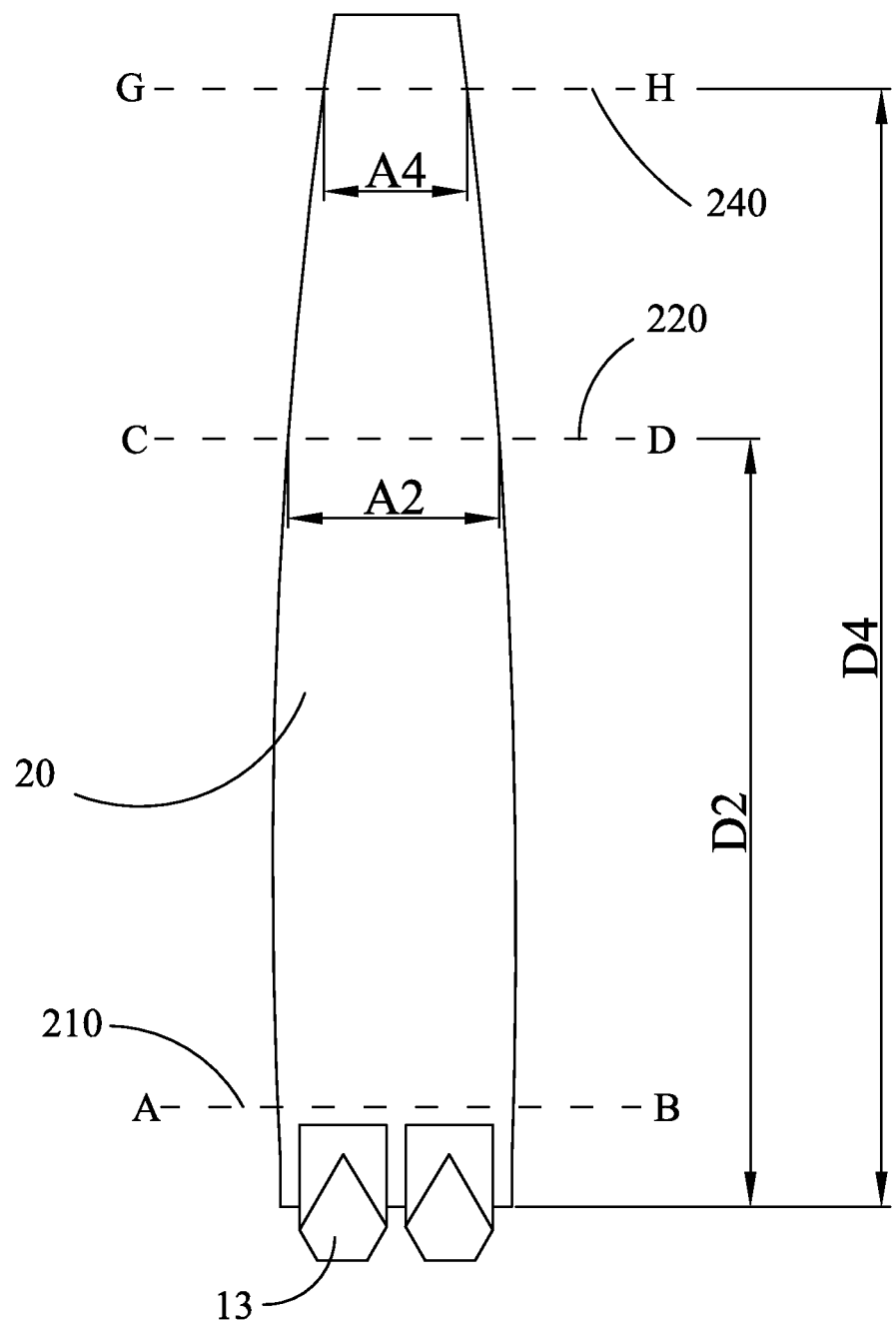
Figure 3E:
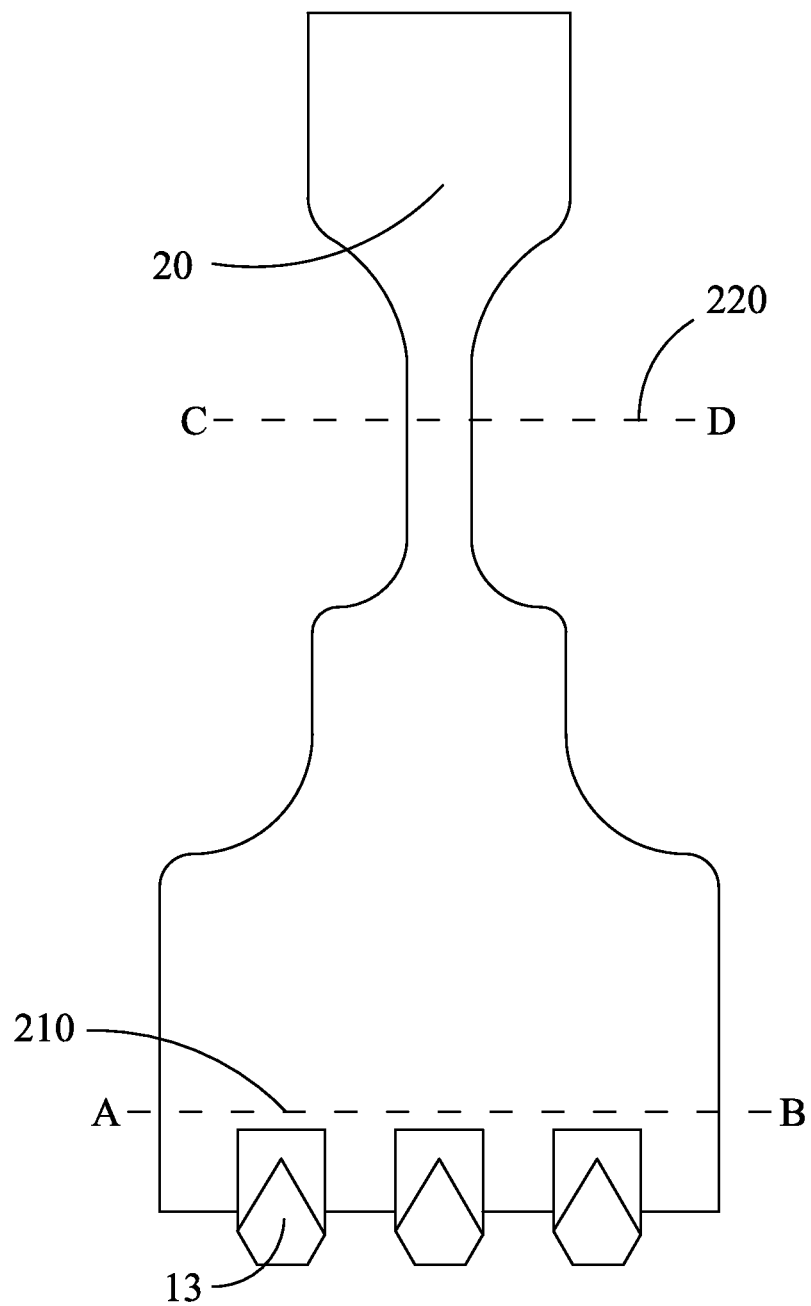

As shown in FIG. 3D, the fourth transverse cross-section 240 parallel to the first and the second transverse cross-sections 210, 220, and a distance from the fourth transverse cross-section 240 to the tool 13 is longer than the distance from the second transverse cross-section 220 to the tool 13, and an area of the fourth transverse cross-section 240 is smaller than the area of the second transverse cross-section 220. As shown in FIG. 3E, a stepwise structure is formed between the transverse cross-sections 210 and 220, and the biggest and thickest portion is near the tool 13.

As shown in FIG. 4, the amplitude transformer 20 is a preferred exemplary embodiment in the ultrasonic micron precision molding apparatus 10 of the present invention. The material of the amplitude transformer 20 is selected from anyone of following metals such as stainless steel, die steel, tool steel, aluminum alloy, magnesium alloy and titanium alloy. Prior to the ultrasonic machining, the assembly of the amplitude transformer 20 and the tool 13 should be assessed through simulated analysis in items covering nodes, amplitude and position of the amplitude transformer 20, as well as wave propagation, impedance and interference for the connection between the amplitude transformer 20 and the tool 13.

For the amplitude transformer 20 in FIG. 4, it is a rectangular composite converging ultrasonic amplitude transformer with transverse cross-sections being symmetric rectangularity while longitudinal cross-sections being divided into three portions, wherein the upper portion is elongate rectangular pillar portion, the middle portion is catenoidal transitional portion and the lower portion is enlarged rectangular pillar portion. Because of the symmetric rectangularity in transverse cross-sections, the ratio of "X-axial deformation" to "Z-axial deformation" notated by "X-axial deformation/Z-axial deformation" and also interpreted of "X-axial deformation divided by Z-axial deformation" is named as "deformation ratio of circumferential vibration in X-axis to axial vibration in Z-axis", whose numerical value is in range of 0%-1% while the ratio of "Y-axial deformation" to "Z-axial deformation" notated by "Y-axial deformation/Z-axial deformation" and also interpreted of "Y-axial deformation divided by Z-axial deformation" is named as "deformation ratio of circumferential vibration in Y-axis to axial vibration in Z-axis", whose numerical value is also in range of 0%-1% normally.

In analyzing the ultrasonic energy distributions at the machining head of the tool 13, a plurality of sampling points spread in the transverse cross-section 210 of the amplitude transformer 20 near the tool 13, and are adopted to respectively simulate a "Z-axial deformation" for each sampling point. By statistically calculation, a standard deviation for all these "Z-axial deformations" can be obtained. By dividing the mean value of all these "Z-axial deformations" by the standard deviation, the uniformity or non-uniformity for the ultrasonic energy distributions of the amplitude transformer 20 is suitably derived. In the event of the amplitude transformer 20 in FIG. 4, the non-uniformity for the ultrasonic energy distributions thereof is in range of 0%4% normally. Under such circumstance, an amplitude of the ultrasonic frequency oscillation produced by the ultrasonic generating module 11 is greater or equivalent to an amplitude of the amplitude transformer 20.

In comparison, the common structure of the conventional amplitude transformer is a typical inverted conical shape or horn shape for augmenting ultrasonic amplitude to achieve the machining goal. Whereas, the innovative structure for the amplitude transformer of the present invention is contrived by different variety in assembly configurations of tool and amplitude transformer with enlarged engaging section for amplitude transformer and tool so that a desired uniformity or non-uniformity for the ultrasonic energy distributions of the amplitude transformer 20 is suitably obtained by properly controlling parameters in distributions of deformation and amplitude. With this design of the present invention, the machining precision for workpiece even difficult to access can be efficiently enhanced with ultrasonic.

Figure 5:
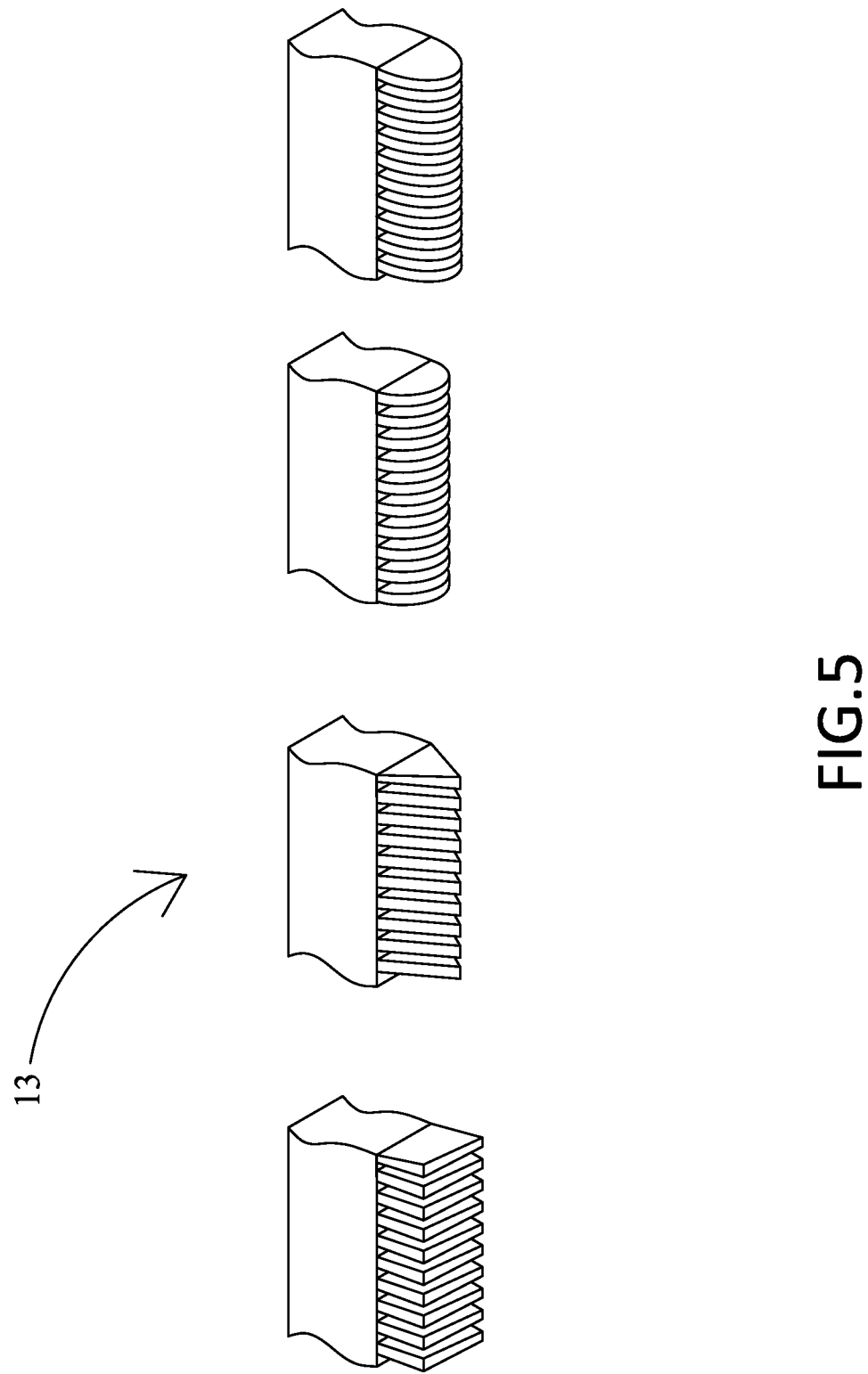
FIG. 5 is an illustrative view for showing four different configurations of various tools in a preferred exemplary embodiment of the present invention.

FIG. 5 is an illustrative view for showing four different configurations of various tools in a preferred exemplary embodiment of the present invention. Wherein, each tool 13 is designed with structural precision in micron scale while the structural shape of the tool 13 is adaptable into following, but not limited, various categories.

The bar category of the tool 13 includes round bar, triangular bar, square bar, rectangular bar, rhomboid bar, polygon bar, elliptical bar and so on.

The frustum category of the tool 13 includes conical frustum, pyramid frustum, pyramid frustum, square frustum, rectangular frustum, rhomboid frustum, polygon frustum, elliptical frustum and so on.

The composite category of the tool 13 includes symmetric/asymmetric barrel, barbell and so on.

The multi-stepped category of the tool 13 includes any combination of anyone of bar category with anyone of frustum category.

The array category of the tool 13 includes a plurality of same shape, which is selected from anyone of categories aforesaid, disposed in array configuration.

The derived category of the tool 13 includes "groove array" or "slot array" created in anyone of the tool 13 in foregoing categories.

Figure 6:
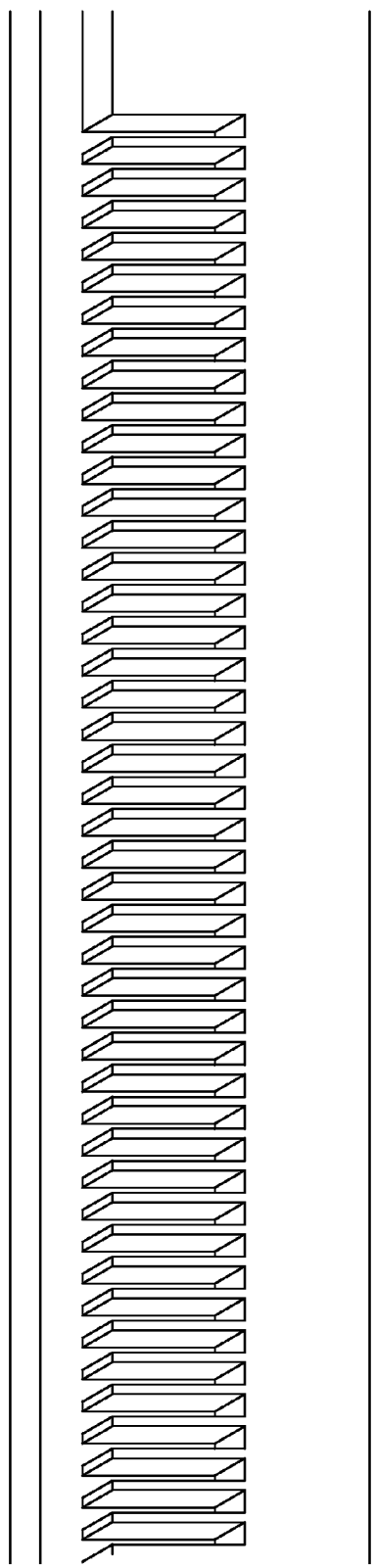
FIG. 6 is an illustrative view for showing a workpiece machining processed by an ultrasonic micron precision molding apparatus of the present invention.

FIG. 6 is an illustrative view for showing a workpiece machining processed by an ultrasonic micron precision molding apparatus of the present invention. The finished product of the workpiece illustrated here is only a preferred example. By means of suitable adoption of the tool 13 selected from the categories for the structural shape of the tool 13, even more complicated workpiece can be easily machined with micron precision.

In conclusion of the disclosure heretofore, two advantageous features in the ultrasonic micron precision molding apparatus of the present invention become apparent as below. In technology, variety in assembly configurations of tool 13 and amplitude transformer 20 with enlarged engaging section for amplitude transformer 20 and tool 13 is created for enhancing the efficiency of the ultrasonic machining, wherein the assembly configuration of tool 13 and amplitude transformer 20 essentially functions as practical machining head in the ultrasonic machining. In methodology, computer-aided simulation is exploited in analyzing all related variables in distributions of amplitude, deformation and ultrasonic energy so that the optimal ultrasonic machining way can be found by means of suitably selecting best assembly configuration of tool 13 and amplitude transformer 20. With these two advantageous features of the present invention, the machining precision for workpiece even having complicated shape access can be efficiently machined with micron precision.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits is described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An ultrasonic micron precision molding apparatus comprising:

an ultrasonic generating module, serving to originate ultrasonic frequency oscillation;

a tool of micron precision, disposed at under side of the ultrasonic generating module; and an amplitude transformer, sandwiched between the ultrasonic generating module and the tool, the amplitude transformer having an enlarged engaging section with a first transverse cross-section firmly fixed on the tool, and the amplitude transformer having a second transverse cross-section parallel to the first transverse cross-section, wherein a profile of the amplitude transformer in a three dimensional coordinate system is represented by three rectilinear axis lines named X axis, Y axis and Z axis vertical to each other, and the Z axis is vertical to the first and second transverse cross-sections, wherein a distance from the second transverse cross-section to the tool is longer than a distance from the first transverse cross-section to the tool, and an area of the first transverse cross-section is larger than an area of the second transverse cross-section, after receiving the ultrasonic frequency oscillation from the ultrasonic generating module, the amplitude transformer has an X-axial deformation, a Y-axial deformation and a Z-axial deformation, wherein a numerical value of the X-axial deformation divided by the Z-axial deformation is larger than 0%, but less than 1%, and a numerical value of the Y-axial deformation divided by the Z-axial deformation is larger than 0%, but less than 1%, wherein the ultrasonic generating module comprises an ultrasound controller and a transducer with functions that the ultrasound controller serves to supply electric power together with vibration mode to the transducer while the transducer serves to originate and transfer ultrasonic frequency oscillation to the amplitude transformer.

2. The ultrasonic micron precision molding apparatus as claimed in claim 1, wherein the amplitude transformer has a third transverse cross-section parallel to the first and the second transverse cross-sections, and a distance from the third transverse cross-section to the tool is longer than the distance from the second transverse cross-section to the tool, and an area of the third transverse cross-section is larger than or equal to the area of the second transverse cross-section.

3. The ultrasonic micron precision molding apparatus as claimed in claim 1, wherein the amplitude transformer has a fourth transverse cross-section parallel to the first and the second transverse cross-sections, and a distance from the fourth transverse cross-section to the tool is longer than the distance from the second transverse cross-section to the tool, and an area of the fourth transverse cross-section is smaller than the area of the second transverse cross-section.

4. The ultrasonic micron precision molding apparatus as claimed in claim 1, wherein a vibration amplitude of the ultrasonic frequency oscillation produced by the ultrasonic generating module is greater or equivalent to an vibration amplitude of the amplitude transformer.

5. The ultrasonic micron precision molding apparatus as claimed in claim 1, wherein the material of the amplitude transformer is selected from a group consisting of stainless steel, die steel, tool steel, aluminum alloy, magnesium alloy and titanium alloy.

6. The ultrasonic micron precision molding apparatus as claimed in claim 1, wherein the first transverse cross-section of the amplitude transformer has a plurality of sampling points spreading therein, adopted to respectively simulate one Z-axial deformation for each of the sampling points to calculate a standard deviation for all these Z-axial deformations such that a value obtained by dividing the mean value of all these Z-axial deformations by the standard deviation is larger than 0%, but less than 1%.

* * * * *